(12) United States Patent
Yu (10) Patent No.: US 6,738,276 B2
(45) Date of Patent: May 18, 2004

(54) UNINTERRUPTED POWER SUPPLY WITHOUT POWER LOSS (75) Inventor: Baichao Yu, Wuhan (CN)

(73) Assignee: Tri-Mag, Inc., Visalia, CA (US)

( * ) Notice: Subject to any disclaimer, the term of this patent is extended or adjusted under 35 U.S.C. 154(b) by 0 days.

(21) Appl. No.: 10/169,240
(22) PCT Filed: Dec. 26, 2000
(86) PCT No.: PCT/CN00/00730
§ 371 (c)(1), (2), (4) Date: Jun. 28, 2002
(87) PCT Pub. No.: WO01/50571
PCT Pub. Date: Jul. 12, 2001

(65) Prior Publication Data
US 2003/0002308 A1 Jan. 2, 2003

(30) Foreign Application Priority Data
Jan. 3, 2000 (CN) .......................... 00114301 A (51) Int. Cl.$^7$ ................................ H02M 5/42
(52) U.S. Cl. ........................................ 363/84
(58) Field of Search .............................. 363/78, 81, 84, 363/125

(56) References Cited

U.S. PATENT DOCUMENTS

| | | | | |
|---|---|---|---|---|
| 4,973,896 A | * | 11/1990 | Shiga et al. | 322/28 |
| 5,684,686 A | * | 11/1997 | Reddy | 363/97 |
| 5,751,564 A | * | 5/1998 | Dien | 363/37 |
| 5,982,645 A | * | 11/1999 | Levran et al. | 363/37 |

* cited by examiner

Primary Examiner—Adolf Berhane
(74) Attorney, Agent, or Firm—Richard A. Ryan (57) ABSTRACT An on-line UPS has radio frequency filter, rectifier filter, battery, detecting circuit, controlling circuit and trigger circuit, and its efficiency approximate a hundred percent. No matter what commercial power is failure, or its voltage is too high or too low, it is able to keep voltage output within normal range. When commercial power is abnormal, it supplies power with battery by automatic switchover, and its response time is zero millisecond. The structure of the present invention is simple and its operation is stable. It has removed the power converter of UPS on the condition that all necessary features are maintained. The costs, volume, weight and power loss decrease to a percent of conventional UPS of same power.

15 Claims, 5 Drawing Sheets

UNINTERRUPTED POWER SUPPLY WITHOUT POWER LOSS

BACKGROUND OF THE INVENTION

1. Field of the Invention

The present invention relates to an uninterrupted power supply without power loss.

2. Background

No matter it is an alternate current (AC) uninterrupted power supply (UPS) or a direct current (DC) uninterrupted power supply(UPS), it consists of a full power converter, which has two functions: one is to perform power conversion, and the other is to keep the voltage constant. The said full power converter is a DC-AC power converter or AC-DC converter with a power handling capacity constantly bigger than output power, while the deference between the power handling capacity and the output power depends on the specific efficiency. A conventional alternate current uninterrupted power supply (AC-UPS) (a power inverter) employs complex circuit and technology to export a constant sine wave voltage. The cost, volume, weight and power loss thereof is ninety nine percent of that of the complete appliance, respectively. In fact, once the stable current of UPS is transmitted into a computer and its peripheral, it is inversely converted, and the direct current voltage is rectified and filtered and then converted into the alternate current voltage. It is not the harmonics but the direct component of the alternate current voltage that the computer and its peripherals need truly. Thus it is unnecessary to invert the direct current into alternate current. At the same time, the harmonics of the alternate current become a major real and latent threat to the computer and its peripherals as well as an incipient fault of data security. Therefore, the optimum voltage for the computer and its peripherals is the direct current voltage. In addition, slow alteration of voltage with time does not produce any adverse effect on the operation stability of the computer and the peripherals. These appliances employ a regulated switch supply inside and don need any constant service voltage. They can run stably and reliably within the normal range of commercial power.

A recent invention of UPS Without Inverter (ZL97241194.1) has not any inverter of a conventional AC-UPS. It has realized the supply of direct current to a computer and its peripherals; it has been a great advance. Although it does not need a full power converter, it needs a compensating voltage to keep the direct current voltage output constant. If the alternate current voltage output varies within 20% of the direct current voltage output, it needs a DC—DC power converter whose power handling capacity is 20% of the full power.

Mission of UPS is: to keep the voltage output without interruption through supplying the power with battery in time by automatic switchover, before the commercial power is failure and the direct current voltage on the user appliance decrease to 75% of the power rating (usually 20 millisecond); and to keep the voltage output within the normal range when the voltage of commercial power is out of the normal range (too high or too low). Therefore, it is a necessary feature of UPS to keep the voltage output within the normal range, but it is a redundant feature to keep the voltage output constant.

Since the direct current power supply has significant advantages over an alternate current power supply, it is an unnecessary move to perform power conversion; since the computer and the peripherals can work stably and reliably within the normal range of commercial power, it is unnecessary to keep the voltage constant. It wastes ninety nine percent of the resources in the manufacture process of the power converter and ninety nine percent of the energy in the process of operation. It is clearly a redundant part of the UPS. There are limited resources on the earth. Energy is also in need. It is unnecessary to consume ninety nine percent of the resources and energy any more for the redundant feature.

SUMMARY OF THE INVENTION

The present invention is intended to overcome the above-mentioned disadvantages, and to remove the power inverter of a conventional UPS while at the same time keep the necessary features, and get rid of the redundant features to approximate an efficiency of a hundred percent and reduce the cost, volume and weight to one percent of the original one.

The aims of the present invention is realized through the following program: the UPS has radio frequency filter, rectifier filter and battery; the rectifier filter employs semi-controlled bridge circuit; after rectifier filter is the detecting circuit, controlling circuit and trigger circuit. The semi-controlled rectifier bridge B1 is used for full-wave rectification and the direct current voltage output thereof as well as the direct current voltage output of the battery are transmitted directly into user appliances without any power conversion.

The direct current voltage output of the rectifier filter is sent out from Pin D4 of the diode. The direct current voltage output of the battery is sent out directly from the silicon control SCR3. The voltages of them are both around 300 volts and loaded on the output ports at the same time. When commercial power is failure, or its voltage input is lower than the set value (for example, 176 VAC), SCR3 is on state, and the voltage of the battery is loaded on the output port in 40 milliseconds (the conducting duration of the silicon control is no more than 40 milliseconds). When the voltage input is higher than the set value (for example, 264 VAC), SCR1 and SCR2 is cut off, the rectifier filter has no output, and thus the high voltage is cut off; at the same tine SCR3 is on state and the voltage of the battery is loaded on the output port. Therefore, the voltage output can always be kept at around 300 volts no matter the commercial power is failure or its voltage is too low or too high.

The uninterrupted power supply without power loss has the following advantages:

1. it has a power consumption commensurate with that of a PN junction of a semiconductor. The overall efficiency of the complete appliance approximates a hundred percent. Thus it is an energy-saving product in the true sense.
2. the cost, volume and weight decrease to a percent of those of conventional UPS, respectively. It saves ninety nine percent of the resources. Thus it is truly an environmental protection product.
3. it has no problem of frequency instability or harmonic interference. With the uninterrupted power supply without power loss, the computer and its peripherals work more stably, and processing and transmitting of data become more save and secure.
4. it can employ natural wind cooling and does not need any rotating heat sink since the heating effect of the complete appliance is low. Thus the dependability is significantly enhanced. Furthermore, no error will happen to the complete appliance in the serviceable life because it has reduced ninety nine percent of the parts of the appliance.

5. simple design, easy manufacture and convenient generalization.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in the attached figures, the preferred embodiments of the present invention are set forth below.

Figure 1:
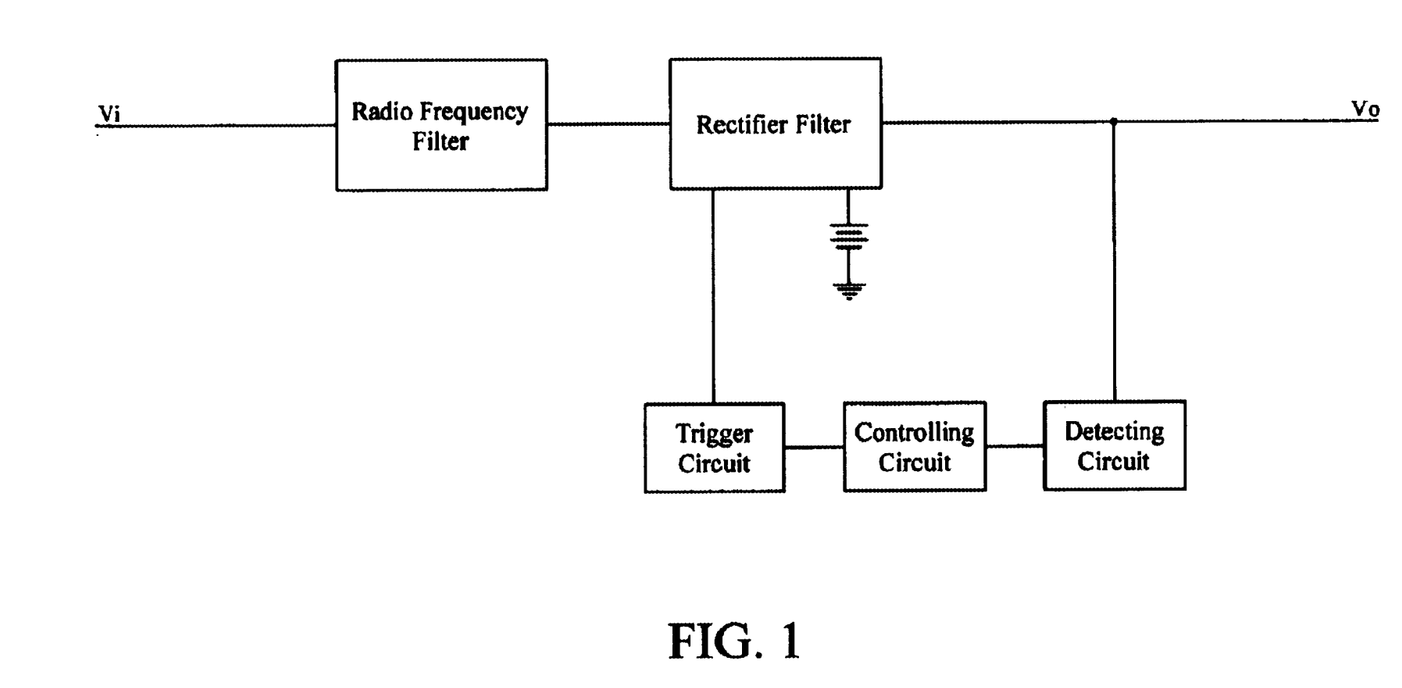
FIG. 1 is a block diagram of an uninterrupted power supply without power loss.

In the block diagram of FIG. 1., a cleaned alternate voltage is obtained after the voltage input passes through radio frequency filter. After passing through the rectifier filter, the obtained voltage turns into a direct current voltage Vo that changes slowly with time, and supplies the load current and the charge current at the meantime. The detecting circuit perceives various changes of the voltage input, voltage output and battery voltage, and then feed the information of these changes to the controlling circuit. The controlling circuit interprets the information and then produces signals of status display and aural warning and trigger, the trigger signal activates the silicon control to control the on state and off state of voltage input Vi and battery voltage E1 appropriately in time.

Figure 2:
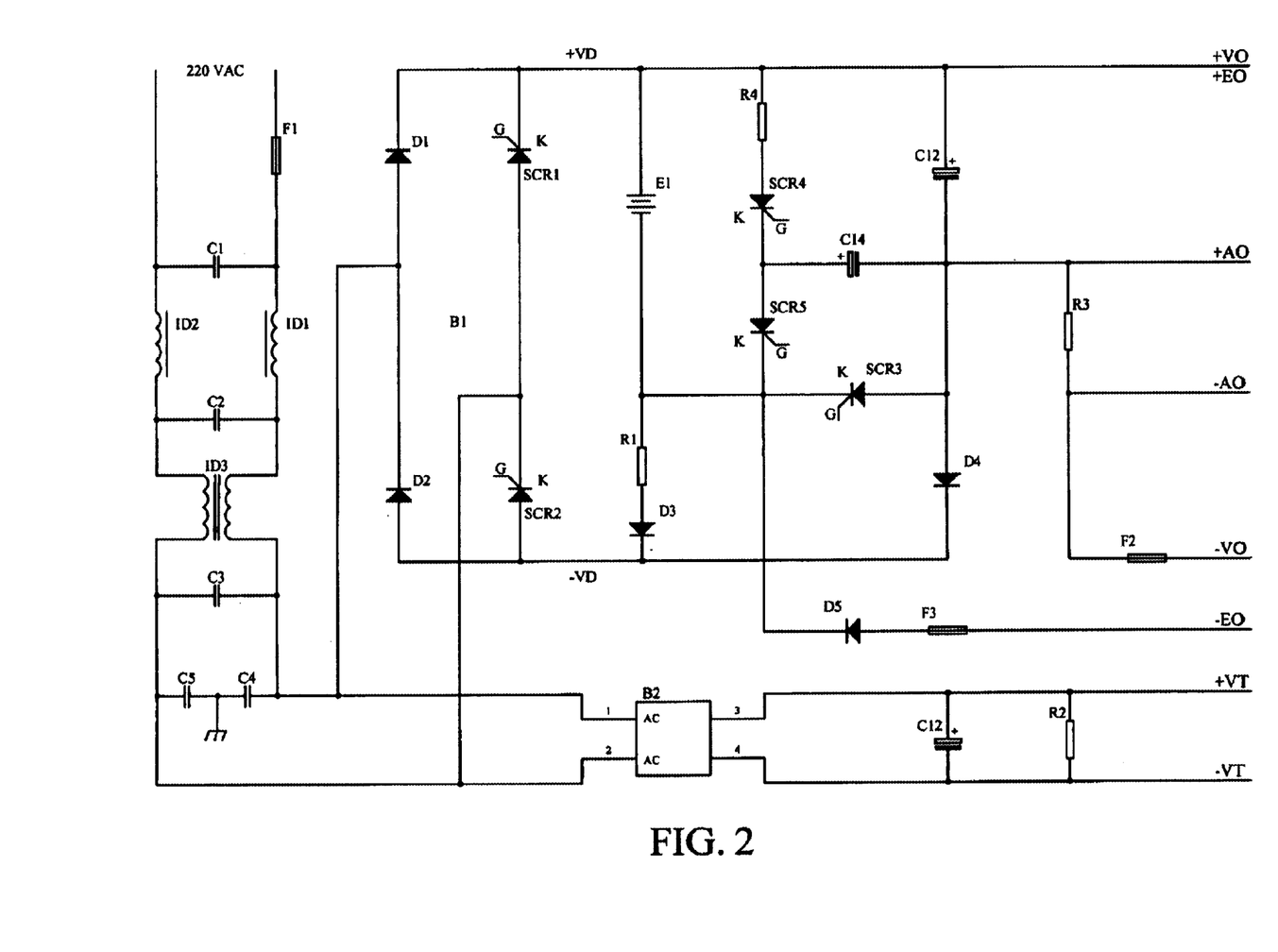
FIG. 2. is a main circuit diagram, including radio frequency filter, rectifier filter and battery.

In the main circuit diagram of FIG. 2., the protector F1, capacitor C1, C2, C3, C4 and C5, and inducers ID1, ID2, and ID3 constitute radio frequency filter. The diode D1 and D2 are connected in series, the silicon control SCR1 and SCR2 are arranged in series, the battery E1, electric resistor R1, and diode D3 are connected in series, and then the four series arms are installed in parallel, wherein each of the positive poles of D1, D2, SCR1 and SCR2 is upward; each of the positive poles of D3, D4, E1 and C12 is downward; the positive pole and negative pole is connected to the negative pole of C12 and the negative pole of E1, respectively; the first two series arms constitute the semi-controlled rectifier bridge B1, and the voltage output of the complete appliance, Vo, is obtained from the two ports of C12 via resistor R3 and protector F2; electronic resistor R4, silicon control SCR4 and SCR5 are connected in series, the positive poles of SCR4 and SCR5 are upward, one end of R4 is connected to the positive pole of E1, and the negative pole of SCR5 is connected to the negative pole of E1; the positive pole and negative pole of the electrolytic capacitor C14 are connected to the negative poles of SCR4 and C12, respectively. The semi-controlled rectifier bridge B1 and the other full-wave rectifier filter bridge circuit composed of rectifier bridge B2, electrolytic capacitor C13 and electric resistor R2 are both connected to the output ports of radio frequency filter. The detecting voltage VT is obtained from the output ports of B2. The resistor R3 is connected to the negative terminal of the output circuit and provides the current A0 to sample the voltage. In FIG. 2., there are four groups of detecting voltage outputs: voltage outputs +V0, −V0; battery voltages +E0, −E0; current outputs +A0, −A0; and voltage inputs +VT, −VT.

Figure 3:
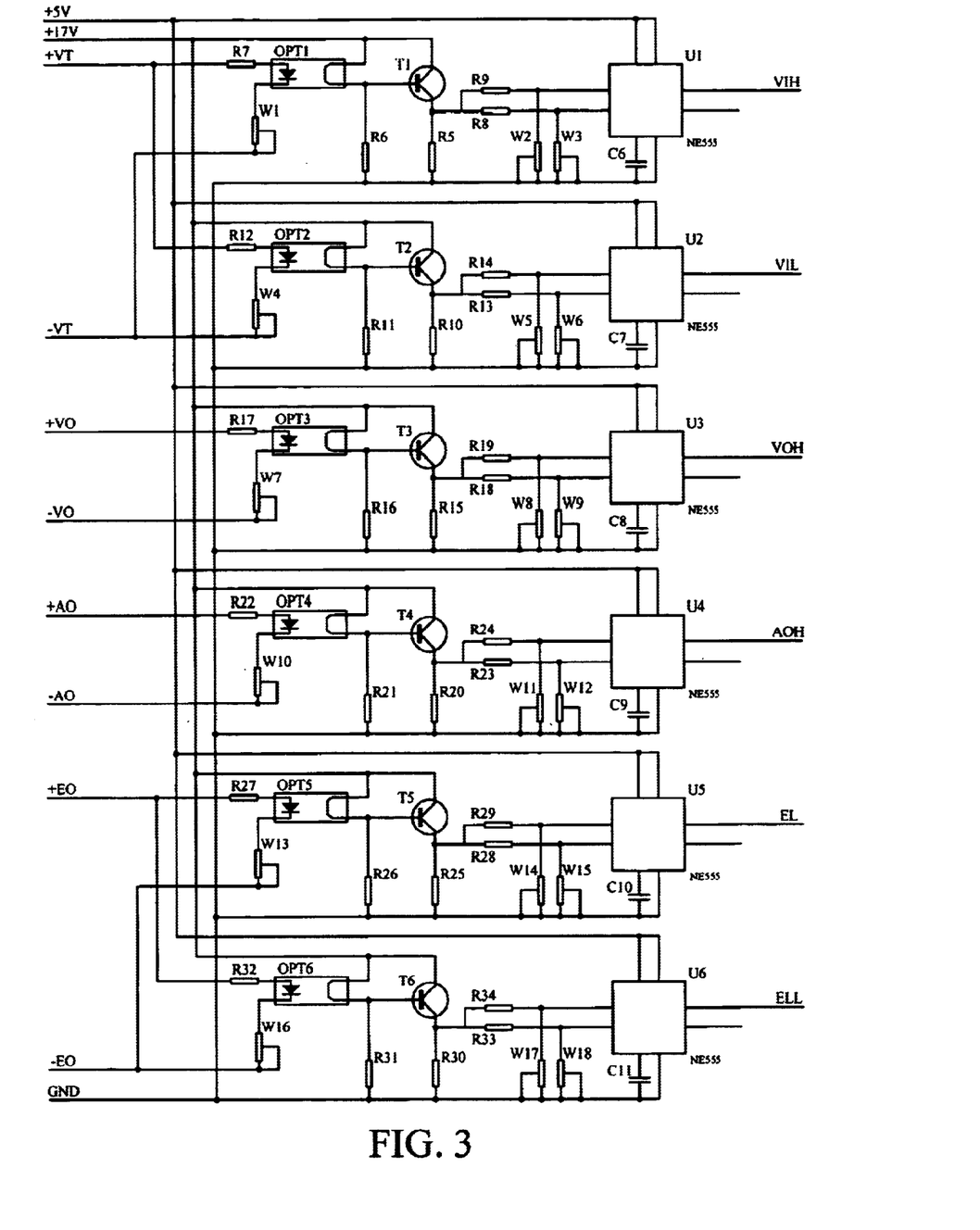
FIG. 3 is a schematic diagram of detecting circuit.

The detecting circuit in FIG. 3 consists of six detecting channels with identical structure. In the first channel, the positive pole of the light-emitting diode of the light electric coupler OPT1 is connected to +VT through resistor R7, and the negative pole is connected to T through the potentiometer W1, the emitter electrode of OPT1 triode is connected to the base electrode of triode T1, the emitters of them are grounded though resistors R6 and R5 respectively, and the collector electrodes of them are all connected to +17 V; Pin 2 and Pin 6 of the controlling circuit U1 are connected to emitter electrode of the triode T1 through resistors R8 and R9, and at the meantime are grounded through potentiometers W2 and W3, Pin 1 of U1 is grounded, Pin 5 is grounded through electric capacitor C6, Pin 4 and Pin 8 are connected to +5 V, and Pin 3 produces output signal VIH.

The second detecting channel is connected to signal VT, which consists of OPT2, T2, U2, W4, W5, W6, R10, R11, R12, R13, R14 and C7; the third detecting channel is connected to input signal V0, which consists of OPT3, T3, U3, W7, W8, W9, R15, R16, R17, R18, R19 and C8; the fourth detecting channel is connected to input signal A0, which consists of OPT4, T4, U4, W10, W11, W12, R20, R21, R22, R23, R24 and C9; the fifth detecting channel is connected to input signal E0, which consists of OPT5, T5, U5, W13, W14, W15, R25, R26, R27, R28, R29 and C10; the sixth detecting channel is connected to input signal E0, which consists of OPT6, T6, U6, W16, W17, W18, R30, R31, R32, R33, R34 and C11. The four signals of the detecting circuit from the main circuit, V0, E0, A0 and VT, produce six output signals: high input voltage VIH, low input voltage VIL, high output voltage VOH, high output amperage AOH, low electric potential of the battery EL and very low electric potential of the battery ELL.

Model number of OPT1 is 4N26, wherein signals are inputted into the light-emitting diode through R7 and W1. Some of the signals are high voltage. Some of the signals are low voltage. Obtain different step-down voltages of R1 and then regulate W1 to accommodate it to input signals of different voltage classes and optimize the current of OPT1 light-emitting diode. The triode T1 is 2SC733, which together with R4 constitutes an emitter follower and produces the first-order current amplification. Model number of the controlling circuit is NE555, wherein Pin 2 and Pin 6 are connected to the emitter electrode of T1, and R8 and R9 are isolating resistors. The adjusting arm of W2 is positioned at a place corresponding to the set value of voltage input Too High and the position of the adjusting arm of W3 corresponds to the set value of voltage input Not High The output signal VIH can be adjusted to a transition point corresponding to the value between Too High and Not High by regulating W2 and W3. It can be leant from the input and output logic relationships that: the output signal is Active-Low when it is to detect the input signal oo High and the output signal is active-High when it is to detect the input signal Too Low wherein VIH, VOH and AOH are all active-low and VIL, EL and Ell are all active-high.

Figure 4:
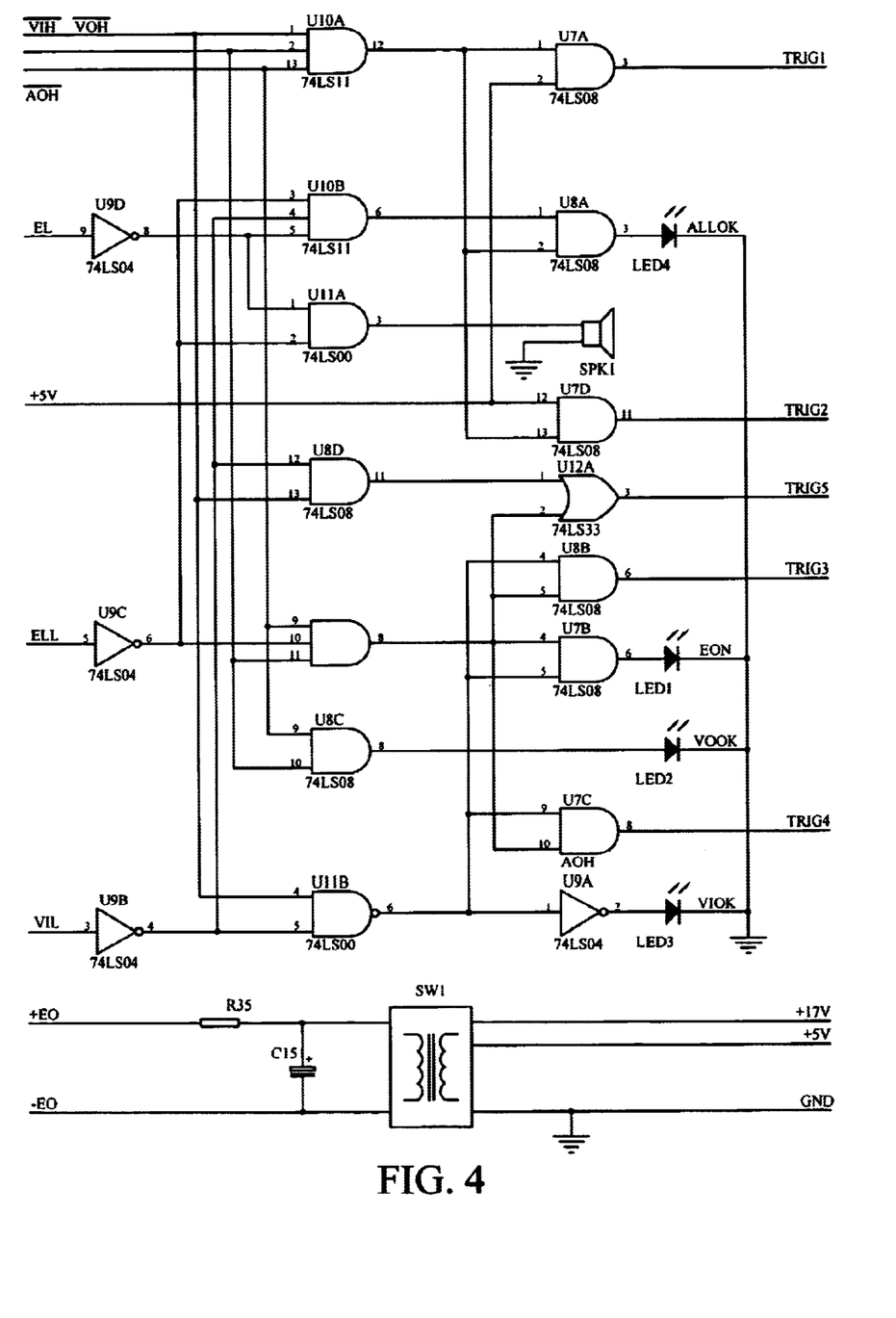
FIG. 4 is a schematic diagram of controlling circuit.

Controlling circuit in FIG. 4 consists of U10A, U10B and U10C, two-input AND-NOT gates U11A and U11B, two-input NOR gate U12A, two-input AND gates U7A, U7B, U7C, U7D, U8A, U8B and U8C, and NOT gates U9A, U9B, U9C and U9D, which produces five trigger signals TRIG1–TRIG5, and four signals controlling the illuminating status of indicator light: ok for the complete appliance ALLOK, battery discharging EON, normal input voltage VOOK and normal voltage output VIOK, and one control signal to activate aural warning SPK1; and the logic equations to produce the above-mentioned ten signals are:

TRIG1=TRIG2=!(!VIH#!VOH#!AOH);

TRIG3=TRIG4=EON=!(AOH#! VOH#! VIH& VIL#ELL);

TRIG5=!(VIH&!VIL#AOH&!ELL&VOH);

ALLOK=!(!AOH# VOH# VIL#! VIH# ELL# EL);

VOOK=!(!AOH#!VOH);

VIOK=!(!VIH#VIL);

SPK=!(!EL&!ELL).

The above logic equations are written in the hardware description language ABEL, a commercially available programmable language. In the ABEL language, the symbol "!" represents a logical complement or inversion operation, the symbol "&" represents a logical AND operation and the symbol "#" represents a logical OR operation. The circuit in FIG. 4 passed the third-order simulation of the Abel language, wherein the U7A and U7B are two redundant gates that can reduce the time difference of signals TRIG1–TRIG5 to reach the triggered silicon gate.

The switch supply SW1 provides the controlling voltage for the complete appliance, wherein the positive pole thereof is connected to +E0 through resistor R35, the negative pole thereof is connected directly to 0, and an electrolytic capacitor C15 is connected between the positive and negative pole. There are two groups of voltages on the input port, +5 V and +17 V, with the common ground GND.

Figure 5:
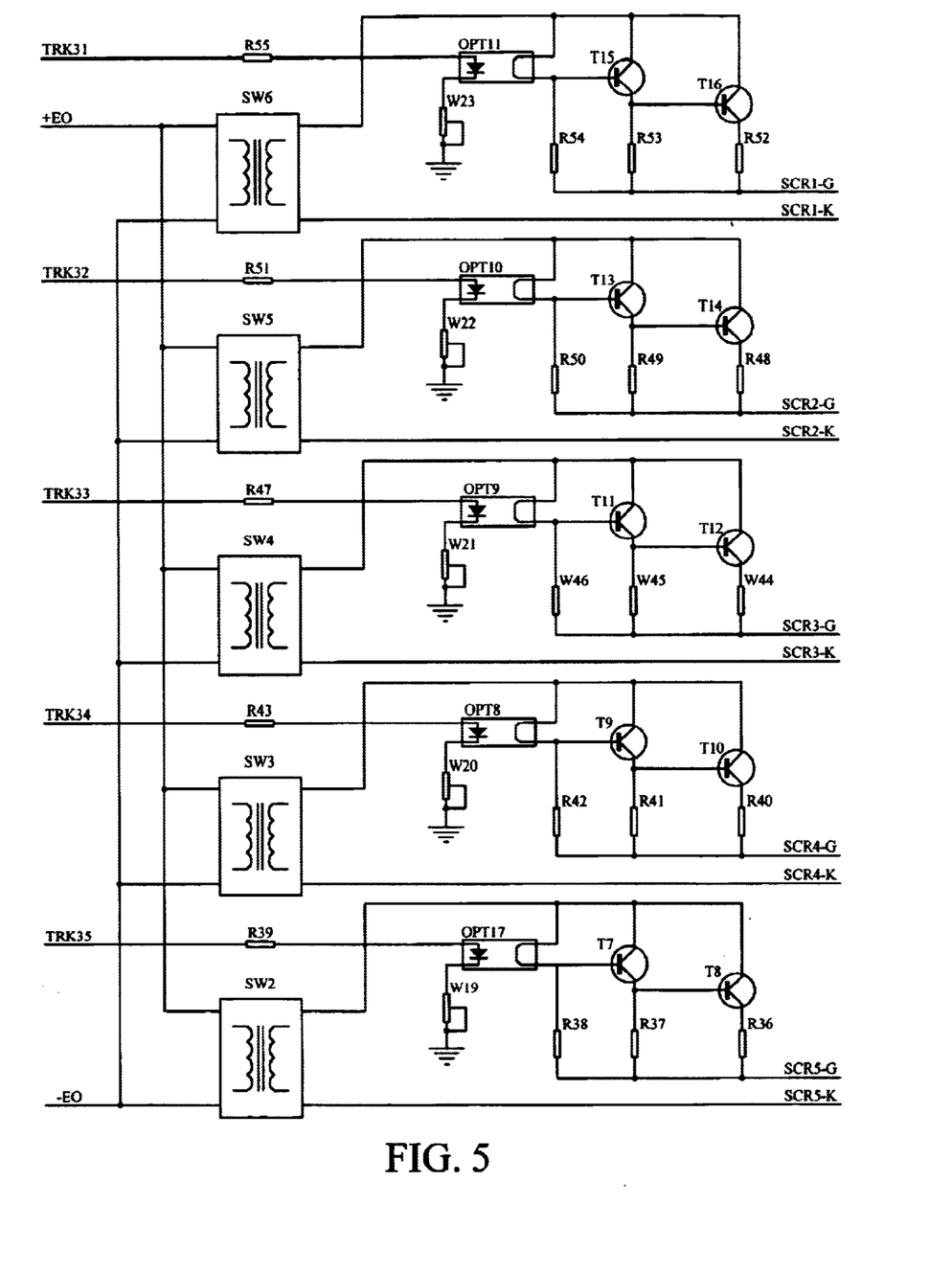
FIG. 5 is a schematic diagram of trigger circuit.

The trigger circuit in FIG. 5 consists of five groups of circuits with identical structure, wherein each group has a +17V independent direct current voltage provided by a switch supply and the positive poles and the negative poles of those switch supplies are connected to +E0 and 0, respectively. For the first group of triggered silicon control SCR1, the negative pole of the switch supply SW6 is connected to the negative pole K of the silicon control SCR1, and the positive pole thereof is connected to the collector electrode of the light electric coupler OPT11 triode and the collector electrodes of the triodes T15 and T16; the negative pole of the OPT11 light-emitting diode is grounded through potentiometer W23, the positive pole thereof is connected to control signal TRIG1 through resistor R55, the emitter electrode of OPT11 triode and those of T15 and 16 are connected to the control electrode of silicon control SCR1 at the meantime through resistors R54, R53 and R52. The model number of OPT11 is 4N26. Change the trigger current flowing through SCR1 by regulating W23. The model numbers of the triodes T15 and T16 are 2SC733 and 2SC5250, respectively. They together with R53 and R 52 constitute an emitter follower to provide second-order amplification of electric currents.

The second group of circuits consist of light electric coupler OPT10, triodes T13 and T14, potentiometer W22, resistors R8, R49, R50 and R51, and switch supply SW5; the third group of circuits consist of light electric coupler OPT9, triodes T11 and T12, potentiometer W21, resistors R44, R45, R46 and R47, and switch supply SW4; the fourth group of circuits consist of light electric coupler OPT8, triodes T9 and T10, potentiometer W20, resistors R40, R41, R42 and R43, and switch supply SW3; the fifth group of circuits consist of light electric coupler OPT7, triodes T7 and T8, potentiometer W19, resistors R36, R37, R38 and R39, switch supply SW2.

The trigger circuits produces five groups of trigger signals: SCR1-G, SCR1-K, SCR2-G, SCR2-K, SCR3-G, SCR3-K, SCR4-G, SCR4-K, SCR5-G, SCR5-K; these signals trigger the silicon control SCR1–SCR5, respectively.

The working process of the present invention is as follows:

First, the silicon controls SCR1 and SCR2 that constitute the semi-controlled rectifier bridge B1 in the FIG. 2 is always on state when commercial power is normal. Actually B1 is performing full-wave rectification. The pulsating voltage VD outputted therefrom is filtered by C12 and then turns into a direct current voltage V0 and outputted. At the meantime VD charges the battery E1 through resistors R1 and D3. The electric potential of E1 is connected to the output port through SCR3. When everything is normal, the detecting circuit perceives VIH=1, VIL=0, AOH=1 and ELL=0. After these signals pass through the logic gates of the controlling circuit, the result is to get TRIG1 and TRIG2 that are high, and TRIG3, TRIG4 and TRIG5 that are low. Thus SCR1 and SCR2 are on state and SCR3, SCR4 and SCR5 are off state, and the voltage on the output port, V0, comes from the semi-controlled rectifier bridge B1.

Second, there are three cases when the electric potential of the battery is normal and the output ports are short-circuited:

1. When commercial power is failure, the detecting circuit perceives VIH=1, VIL=1, AOH=1, and ELL=0. After these signals pass through the logic gates of the controlling circuit, the result is to get TRIG1, TRIG2, and TRIG3 that are high. SCR1 and SCR2 are off state because of no anode current. The commutating voltage VD equals zero. SCR3 is always on state during the period. The electric potential of the battery E1 is loaded onto the output ports. After commercial power supply restores service, VIL=0. After the signal passes through the logic gates of the controlling circuits, the result is to get TRIG1 and TRIG2 that are high, and TRIG3 that is low, which is the same as the status before the power failure. At the moment when commercial power recovers, the direct current voltage V0 after being rectified and filtered is bigger than the terminal potential of battery E1 while SCR3 is off state because of reverse bias.

2. When voltage of commercial power is too low, things are similar to those when commercial power is failure. What is different is that SCR1 and SCR2 are on state and the commutating voltage VD doesn equal zero. Since SCR3 has been on state, on the positive pole of D4 is the terminal potential of E1, which is higher than the commutating voltage VD on the negative pole of D4 and thus D4 becomes reverse biased. Thus the voltage on the output port comes from the E1. With the slow rise of the voltage of commercial power and the slow decrease of the discharge voltage of the battery, the voltages loaded on the positive pole and the negative pole of D4 become very close to each other. On a certain moment, D4 becomes forward biased, and then the current output is provided by both V0 and E0 at the meantime. When commercial power supply is on normal service again, SCR becomes off state because of reverse bias.

3. When the voltage of commercial power is too high, the detecting circuit perceives that VIH=0, VIL=0, AOH=1 and ELL=0. After passing through the logic gates of the controlling circuit, the result is to get TRIG1 and TRIG2 that are low, and TRIG3 that is high, and there are no trigger signals on the controlling electrodes of SCR1 and SCR2. When alternate current voltage crosses zero, they are automatically cut-off and thus the high voltage is cut off. During the process, SCR3 is always on state, and the electric potential of battery E1 is loaded on the output ports. When commercial power is normal again, VIH=0, then the signal passes through the logic gates of the controlling circuit and the result is to get TRIG1 and TRIG2 that are high, and TRIG3 that is low, and it returns to the original state.

Third, there are two cases when the electric potential of the battery is normal and the output ports are short-circuited:
1. When the alternate current voltage is accidentally short-circuited, the detecting circuit perceives that VIH=1, VIL=0, AOH=0 and ELL=0, these signals pass through the logic gates of the controlling circuit and then get TRIG1, TRIG2 and TRIG3 that are low. Thus SCR1, SCR2 and SCR3 are cut off, and the voltage on the output port, V0, equals zero, so that the user appliance is protected. When the short circuit is relieved, AOH=1 and it restores the original state.
2. When the alternate current voltage is abnormal (the alternate current is failure, too low or too high), it can be learnt from the above that: before the short circuit happens, the electric potential of the battery is loaded to the output port through SCR3; and after the short circuit happens, the detecting circuit detects that VIH=0 or VIL=1, AOH=0, and ELL=0, and then these signals pass through the logic gates of the controlling circuit to get TRIG1, TRIG2 and TRIG3, that are low, and TRIG5 that is high. Therefore, SCR1 and SCR2 are off state and SCR5 is on state. Due to the on state of SCR5, SCR3 becomes off state and the voltage on the output port V0 is cut off, so that the user appliance is protected. When the short circuit is relieved, AOH=1 and it returns into the original state. Hereby, the process of off state of SCR3 caused by the on state of SCR5 is the same as that happens when the electric potential of the battery is too low.

Fourth, the electric potential of the battery is too low and the output port is short-circuited. When the alternate current voltage is abnormal (the alternate current is failure, too low or too high), SCR3 is on state, the electric potential of the battery is connected to the output port. It can be learnt from the logic circuit in FIG. 4 that TRIG4 and TRIG3 change synchronously and therefore when SCR3 is on state, SCR4 is also on state, the potential of E1 charges the C14 through the series arm of R4, SCR4, C14 and SCR3. When the charging current flowing through SCR4 is lower than its sustaining voltage, SCR4 is automatically off state and at the moment the potential that has been charged on C14 is commensurate to that of E1. When the failure of commercial power lasts too long and the discharge voltage of the battery approximates the warning voltage, ELL=1. After the signal passes through the logic gates of the controlling circuit, the result is to get TRIG5 that is high, SCR5 is on state, and the positive potential on C14 is loaded on the negative pole of SCR3 through the forward direct current resistor of SCR5. Therefore, SCR3 is cut off due to reverse bias, and the battery stops discharging to prevent the damages due to over discharging.

Fifth, charging and discharging of battery. The positive pole of the battery E1 and the positive pole of semi-controlled rectifier bridge B1 are connected to each other, and the negative pole of E1 is connected to the negative pole of the B1 through resistor R1 and diode D3. The positive poles of B1 and E1 are connected to the output port. The negative pole of B1 is connected to the output port through diode D4. The negative pole of E1 is connected to the output port through silicon control SCR3. When commercial power is normal, B1 charges E1 through D3 and R1. When E1 has just finished discharging, the terminal potential is relatively low, the charging current is very high, and R1 acts as a current limiting resistor. At the moment, charging of E1 enters into the fast charging mode. When E1 is about to be fully charged, the charging current diminishes, and the voltage drop on R1 is so small that it has no effect on the charging circuit. At the moment, charging of E1 enters into the floating charge mode. Since the filter electrolytic capacitor C12 is connected to the left of D4 and there is no electronic capacitor on the left, the voltage wave on the left and that on the right of D4 are different: on the left is a single side pulsating sine wave VD with a frequency of 100 Hz and an amplitude of 308 V, and on the right is direct current voltage V0 that changes slowly with time. V0 fluctuates with the magnitude of voltage input and the load, but the charging voltage VD of the battery remains basically the same and is approximately equal to the amplitude of the alternate current voltage, which is mainly because the buffering action of D3, D4 and SCR3. Only if commercial power is not failure, E1 is always being charged and never discharges, and doesn't fluctuate over time with the change of V0. Thus E1 undergoes floating charge to a potential of 308 V or more than that and the state is continuously maintained.

Sixth, some points of explanation:
1. The aim of using a semi-controlled rectifier bridge is to cut off the high voltage fast once the voltage of commercial power is too high. If use a conventional rectifier bridge, an additional silicon control must be added apart from the rectifier bridge, and thus the power loss thereof doubles.
2. The SW1 in FIG. 4 and the SW2-6 in FIG. 5 are all low power switch supplies commercially available. Their power ratings are all within 10 W, and the powers of SW2–SW6 are slightly different, depending on the trigger silicon control. For the micromidi uninterrupted power supply without power loss with the overall power of the complete appliance lower than 50 KW, SW1–SW6 can be replaced by a switch supply with six independent coils.
3. When commercial power is out of normal range, SCR3 becomes on state, and the electric potential of E1 is loaded onto the output port. At the moment, E1 undergoes free discharge. Apart from a 0.7 V voltage drop on SCR3, there are no other power losses. The efficiency= (308-0.7)/308=99.8%. The direct current voltage VD is directly outputted through diode D4 after rectification. Therefore, the above equation of efficiency is also applicable to the case of normal commercial power supply.
4. The present invention keeps the necessary features of UPS entirely, while the main appliance is simple enough to have only several diodes and silicon controls, and get a 25 KW power output with rectifying parts of a current rating of 100 A. The efficacy corresponds to that of a 30 KVA conventional UPS.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. An uninterrupted power supply without power loss comprising:
   a radio frequency filter connected to an alternating current input;
   a rectifier filter connected to said radio frequency filter, said rectifier filter configured to output a direct current output;
   a battery operatively connected to said rectifier filter, said rectifier filter configured to charge said battery, said battery configured to output a direct current battery output;
   a detecting circuit connected to said rectifier filter;
   a control circuit connected to said detecting circuit; and
   a trigger circuit interconnecting said control circuit and said radio frequency filter.

2. A power supply according to claim 1, characterized by that the diodes (D1) and (D2) are connected in series, the silicon control (SCR1) and (SCR2) are connected in series, the battery (E1), resistor (R1), electrolytic capacitor (C12), and diode (D4) are connected in series, and then the above four series arms are connected in parallel, wherein the positive poles of diodes (D1) and (D2) and silicon control (SCR1 and SCR2) are downward and the positive poles of diodes (D3 and D4), battery (E1) and electrolytic capacitor (C12) are upward; the positive pole and the negative pole of silicon control (SCR3) are connected to the negative pole of electrolytic capacitor (C12) and the negative terminal of battery (E1), respectively; and the first two series arms constitute the semi-controlled rectifier bridge (B1), and the overall voltage output (V0) of the complete appliance is obtained from the two terminals of electrolytic capacitor (C12) through resistor (R3) and protector (F2); the resistor (R4), silicon controls (SCR4 and SCR5) are connected in series, the positive poles of silicon controls (SCR4 and SCR5) are upward, one terminal of battery (E1) is connected to the positive pole of battery (E1) the negative pole of silicon control (SCR5) is connected to the negative terminal of battery (E1), and the positive pole and the negative pole of the electrolytic capacitor (C14) are connected to the negative pole of silicon control (SCR4) and the negative pole of electrolytic capacitor (C12), respectively.

3. A power supply according to claim 1, characterized by that the detecting circuit comprises six detecting channels with identical stricture, in the first detecting channel the positive pole of the light-emitting diode of the light electric coupler (OPT1) is connected to detecting voltage (+VT) through electric resistor (R7) and the negative pole is connected to triode (T) through potentiometer (W1), the emitter electrode of light electric coupler (OPT1) triode and the base electrode of triode (T1) is connected to each other, and their emitter electrodes are grounded through resistors (R6) and (R5) respectively, and the collector electrodes are all connected to +17 V; Pin (2) and Pin (6) of the controlling circuit (U1) are connected to the emitter electrode of triode (T1) through resistors (R8) and (R9)respectively, and are at the meantime grounded through potentiometers (W2) and (W3), Pin 1 of controlling circuit (U1) is grounded, Pin 5 of the electrolytic capacitor (C6) is grounded, Pin 4 and Pin 8 are connected to +5 V, and Pin 3 is connected to output signal (VIH).

4. A power supply according to claim 1, characterized by that: the controlling circuit consists of three-input AND gates (U10A, U10B and U10C), and two-input AND-NOT gates (U11A and U11B), two-input NOR gate (U12A), two-input AND gate (U7A, U7B, U7C, U7D, U8A, U8B, and U8C), and NOT gates (U9A, U9B, U9C, and U9D), which produces five trigger signals (TRIG1–TRIG5), and four control signals of illuminating status of the indicator lights: ok for complete appliance (ALLOK), battery discharging (EON), normal voltage output (VOOK), and normal voltage input (VIOK), and one control signal to trigger the aural warning (SPK1); and the logic equations for the hardware description language ABEL to produce these ten signals are as follows:

$TRIG1=TRIG2=!(!VIH\#!VOH\#!AOH);$ $TRIG3=TRIG4=EON=!(AOH\#! \ VOH\#! \ VIH\& \ VIL\#ELL);$ $TRIG5=!(VIH\&!VIL\#AOH\&!ELL\&VOH);$ $ALLOK=!(!AOH\# \ VOH\# \ VIL\#! \ VIH\# \ ELL\# \ EL);$ $VOOK=!(!AOH\#!VOH);$ $VIOK=!(!VIH\#VIL);$ $SPK=!(!EL\&!ELL).$

5. A power supply according to claim 1, characterized by that the trigger circuit consists of five groups of circuits with identical structure, wherein the first group triggers silicon control (SCR1), the switch supply (SW6) provides an independent voltage of +17 V for the group, the negative pole thereof is connected to the negative pole (K) of silicon control (sCR1), and the positive pole thereof is connected the collector electrode of the light electric coupler (OPP11) triode and the collectors of triodes (T15) and (T16); the negative pole of light electric coupler (OPP11) light-emitting diode is grounded through potentiometer (W23), the positive pole thereof is connected to the control signal (TRIG1) through resistor (R55), the emitter electrode of light electric coupler (OPP11) triode and the emitter electrodes of triodes (T15 and T16) are connected to resistors (R54, R53 and R52) and at the meantime connected to the controlling electrode (G) of silicon control (SCR1).

6. A power supply according to claim 1, characterized by that the semi-controlled rectifier bridge is used for full-wave rectification, wherein the direct current voltage output and the direct current voltage of the battery is directly transmitted into a user appliance without any power conversion.

7. A power supply according to claim 1, wherein said detecting circuit is configured to perceive one or more changes in said alternating current input, said direct current output and said direct current battery output and communicate said one or more changes to said control circuit.

8. A power supply according to claim 7, wherein said control circuit is configured to display one or more display signals.

9. A power supply according to claim 7, wherein said trigger circuit is configured to control said alternating current input and said direct current battery output to said rectifier circuit.

10. A power supply according to claim 7, wherein said rectifier filter comprises a semi-controlled rectifier bridge configured for full-wave rectification.

11. A power supply according to claim 10, wherein said trigger circuit is configured to control said alternating current input and said direct current battery output to said rectifier circuit.

12. A power supply according to claim 1, wherein said control circuit is configured to display one or more display signals.

13. A power supply according to claim 1, wherein said trigger circuit is configured to control said alternating current input and said direct current battery output to said rectifier circuit.

14. A power supply according to claim 1, wherein said rectifier filter comprises a semi-controlled rectifier bridge configured for full-wave rectification.

15. A power supply according to claim 1, wherein said battery is connected to a silicon controller and said direct current battery output is output directly from said silicon controller.

* * * * *